United States Patent [19]

Johnson

[11] Patent Number: 4,933,949
[45] Date of Patent: Jun. 12, 1990

[54] ARRANGEMENT FOR MULTIPLEXING AND INTENSITY SPLITTING LIGHT BEAMS FOR INTERFACE INTO FIBER OPTIC CABLES

[75] Inventor: Steve A. Johnson, Tracy, Calif.

[73] Assignee: The United States of America as represented by the United States Department of Energy, Washington, D.C.

[21] Appl. No.: 329,721

[22] Filed: Mar. 28, 1989

[51] Int. Cl.⁵ .............................. H01S 3/20
[52] U.S. Cl. .......................... 372/53; 372/6; 372/23; 372/99; 372/108; 350/96.3
[58] Field of Search ............. 372/6, 23, 53, 54, 99, 372/100, 101, 108; 350/96.3

[56] References Cited

U.S. PATENT DOCUMENTS 4,143,338  3/1979  Godard et al. .................. 372/100

*Primary Examiner*—Georgia Y. Epps
*Attorney, Agent, or Firm*—Miguel A. Valdes; Roger S. Gaither; William R. Moser

[57] ABSTRACT

An arrangement especially suitable for use in a laser apparatus for converting a plurality of different input light beams, for example copper vapor laser beams, into a plurality of substantially identical light beams is disclosed herein. This arrangement utilizes an optical mixing bar which is preferably integrally formed as a single unit and which includes a main body for mixing light therein, a flat input surface on one end of the main body, and a multi-faceted output face on the opposite end of the main body. This arrangement also includes means for directing the plurality of different input light beams onto the input face of the mixing base, whereby to cause the different beams to mix within the main body of the mixing bar and exit the latter from its multi-faceted output face as the desired plurality of substantially identical output beams.

13 Claims, 3 Drawing Sheets

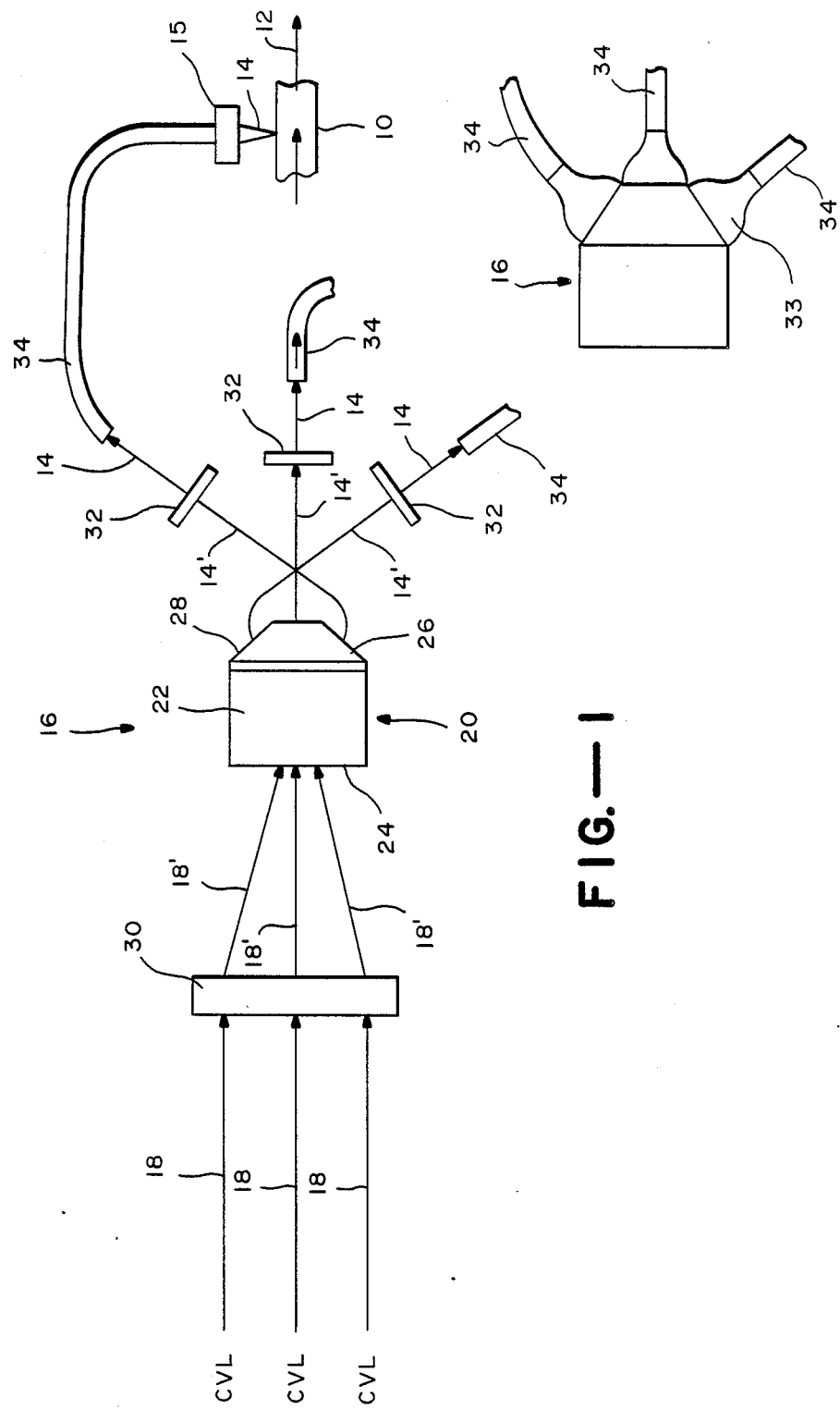

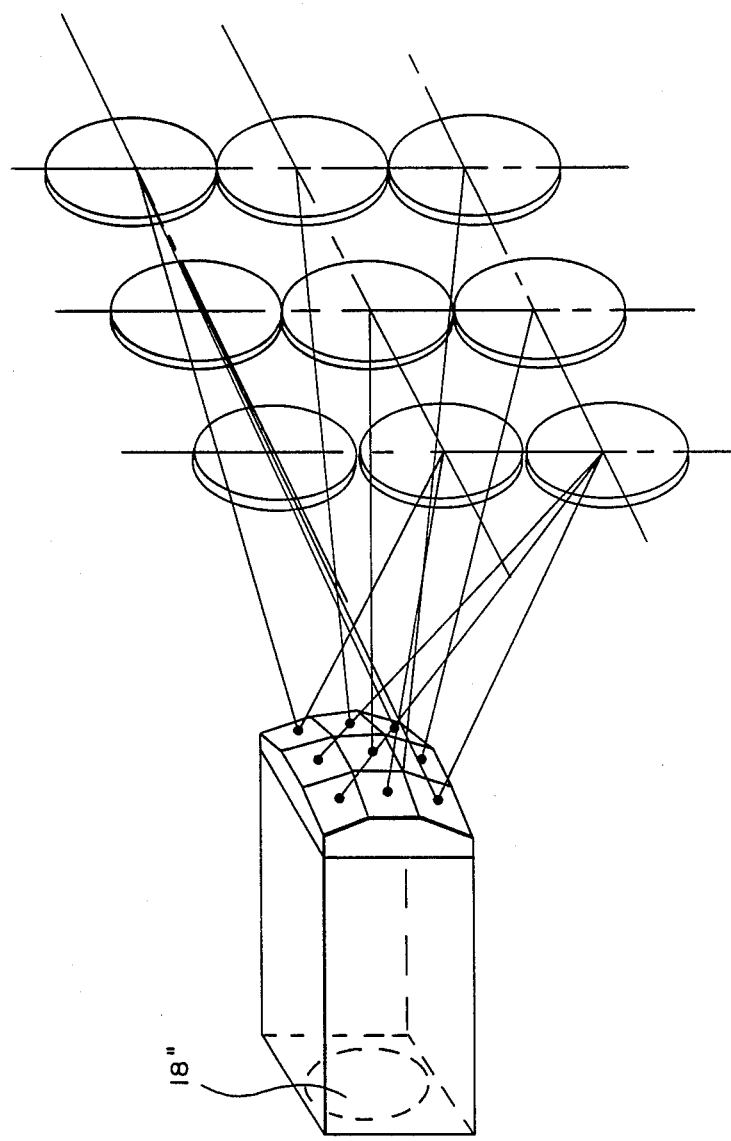
FIG.—2

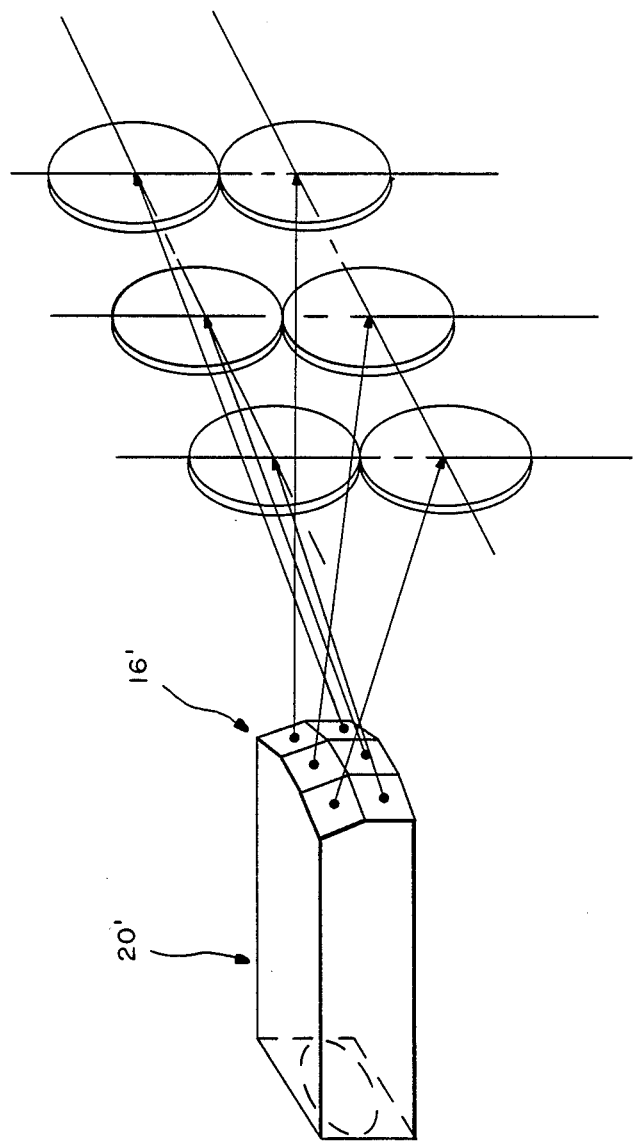
FIG.—3

ARRANGEMENT FOR MULTIPLEXING AND INTENSITY SPLITTING LIGHT BEAMS FOR INTERFACE INTO FIBER OPTIC CABLES

FIELD OF THE INVENTION

The U.S. government has rights in this invention pursuant to contract number W7405-ENG-48 between the U.S. Department of Energy and the University of California for the operation of the Lawrence Livermore National Laboratory.

BACKGROUND OF THE INVENTION

The present invention relates generally to optical techniques and more particularly to a technique for multiplexing and intensity splitting a plurality of different light beams into a plurality of substantially identical light beams, which technique is especially suitable for use as part of dye laser apparatus.

As indicated immediately above, the present invention is particularly suitable for use as part of an overall dye laser apparatus which may include a dye laser oscillator for initially producing a dye laser beam or a dye laser amplifier for amplifying an already produced beam. In either case, copper vapor laser (CVL) beams are typically used to excite a supply of dye solution in order to produce or amplify the dye beam. In an actual overall apparatus which uses a chain of dye amplifiers, copper vapor laser beams are directed into opposite sides of each dye cell forming part of each amplifier in the chain. As a result, it is necessary to provide a number of CVL beams at the same time. It is desirable that these beams be substantially identical in terms of temporal and spatial information, but the intensity can be controlled separately from each beam. As will be seen hereinafter, the present invention provides an uncomplicated, reliable and yet economical technique for converting a plurality of CVL beams that may differ into substantially identical CVL beams and cooperating means for individually directing these identical beams into cooperating dye cells.

SUMMARY OF THE INVENTION

In view of the foregoing, it is an object of the present invention to provide an uncomplicated, reliable and yet economical technique for multiplexing and intensity splitting a plurality of light beams that may differ into a plurality of substantially identical light beams.

A more specific object of the present invention is to provide the technique recited immediately above as part of an overall dye laser apparatus.

As will be described in more detail hereinafter, the light beam converting technique disclosed herein utilizes an optical mixing bar including a main body for mixing light therein, a flat OR CURVED input face on one end of the main body, and a multi-faceted output face on the opposite end of the main body. Means are provided for directing a group of different input light beams onto the input face of the mixing bar, whereby the light from those beams entering the main body is mixed therein and exits the output face as a plurality of substantially identical output light beams corresponding in number to the number of facets making up the output face The area of each facet can be adjusted to control the amount of energy contained in each output beam.

In a preferred embodiment of the present invention, the input beams directed onto the input face of the mixing bar are imaged onto the input face in an overlapping manner. In the same preferred embodiment, the overall mixing bar including its main body, input face and multifaceted output face is integrally formed as a single unit. In practice the working models of this device were built as a two piece construction due to fabrication difficulties. The mixing bar and the faceted face were two separate assemblies. In the case where this technique is used as part of an overall dye laser apparatus, means are provided for acting on the individual and substantially identical output beams for imaging the at least some of these beams onto the input faces of cooperating optical fibers which, in turn, direct the imaged beams into cooperating dye cells. A variation on the interface of the fibers to the output face is to use tapered transformation cone sections to directly attach the fibers onto the end of the assembly.

Additional objects, advantages and novel features of the invention will be set forth, in part, in the description which follows and in part will become apparent to those skilled in the art upon examination of the following, or maybe learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form part of the specification, illustrate an embodiment of the invention, and together with the description, serve to explain the principles of the invention.

FIG. 1 is a diagrammatic illustration, in plan view, of an arrangement which forms part of an overall dye laser apparatus and which is provided for converting a plurality of different input light beams, for example, copper laser vapor beams, into a plurality of substantially identical output light beams, for example, substantially identical copper vapor laser beams.

FIG. 1A is a modified portion of the arrangement shown in FIG. 1.

FIG. 2 is a different diagrammatic illustration, in perspective view, of the arrangement shown in FIG. 1.

FIG. 3 is a view similar to FIG. 2 but illustrating a modified arrangement (in part) for converting a plurality of different input light beams into a plurality of substantially identical output light beams.

DETAILED DESCRIPTION OF THE INVENTION

Reference will now be made in detail to a preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Turning now to the drawings, wherein like components are designated by like reference numerals throughout the various figures, attention is first directed to FIGS. 1 and 2. A dye cell forming part of an overall dye laser apparatus is shown there. The dye cell may be part of a dye laser oscillator or part of a dye laser amplifier and is generally indicated by the reference numeral 10. Arrows 12 represent a stream of dye solution flowing through the dye cell and arrows 14 represent copper vapor laser beams directed into opposite sides of the dye cell for exciting the dye solution in order to produce or amplify a dye beam (not shown). A lens assembly 15 is required to shape the output beam from the fiber to correctly fill the pump volume in the dye amplifier. One such lens assembly is described in Applicants' U.S. Pat. No. 4,627,068. As indicated previously, it is desirable for the copper vapor laser beams 14 to be substantially identical. As will be seen below, a typical arrangement generally indicated at 16 is designed in accordance with the present invention for multiplexing and intensity splitting a plurality of copper vapor laser beams 18, which might differ, into the substantially identical beams 14.

The present invention is directed specifically to beam converting arrangement 16 and not the dye laser apparatus or the initially produced CVL beams 18. The dye laser apparatus may be of a known kind and, hence, will not be further described herein In like manner, any suitable means may be utilized to produce CVL beams 18 and such means will not be described herein.

Still referring to FIG. 1 in conjunction with FIG. 2, overall light beam converting arrangement 16 is shown including an optical mixing bar 20. Mixing bar 20 includes a generally rectangular main body 22 for mixing light therein, a flat input or curved face 24 on one end of the main body, and a multi-faceted output face 26 including individual facets 28 on the opposite end of the main body. The mixing bar is configured optically so that light entering its main body from input face 24 is mixed therein and exits the output face through facets 28 as a plurality of substantially identical beams corresponding in number to the number of facets making up the output face. The area of each facet can be adjusted to control the amount of energy contained in each output beam. In the particular embodiment illustrated in FIGS. 1 and 2, main body 22 and output face 26 are constructed of two integrally formed pieces of glass configured to function in the manner described. In a preferred embodiment (see FIG. 3), the entire mixing bar is integrally formed from a single piece of glass. In either case, one with ordinary skill in the optics art, in view of the teachings herein, could readily design the mixing bar to function optically in the manner described herein.

Overall arrangement 16 also includes a suitable and readily providable lens assembly generally indicated at 30 for imaging the plurality of CVL beams 18 onto the input face 24 of mixing bar 20. The imaged beams are indicated at 18'. In a preferred embodiment, as illustrated at FIG. 1, all of the beams of 18' are imaged onto input face 24 of the mixing bar in an overlapping manner, as depicted by circle 18" in FIG. 2. As the CVL beams enter the mixing bar from input face 24, the mixing bar substantially uniformly mixes the light therein and causes it to exit the facets output face 26 as a plurality of substantially identical light beams corresponding in number to the number of facets making up the output face. The exiting light beams are generally indicated at 14'.

In addition to mixing bar 20 and lens assembly 30, overall arrangement 16 includes suitable and readily providable output lens assemblies 32 which individually act on output beams 14' for producing previously recited substantially identical beams 14. As illustrated in FIGS. 1 and 2, two of these lens assemblies image their respective beams onto the input faces of cooperating optical fibers 34. An optional method of interface to the fibers from the output faceted face is to use tapered cone sections. These cone sections direct and correctly size the beam to fit into the fiber. The tapered sections replace the output lens assemblies (as shown in FIG. 1A at 33). The opposite ends of these optical fibers are suitably optically coupled to the dye laser apparatus so as to direct the CVL beams entering each fiber input face to a lens assembly 15 which in turn shapes the beam to illuminate the dye cell 10. The other CVL beam 14 may be directed to other dye laser apparatus or, in the case of dye laser amplifiers, they may be directed to other dye laser amplifiers in the overall chain.

FIG. 3 illustrates an overall light beam converting arrangement 16' which may be identical in most respects to previously described arrangement 16. One primary difference between the two is that mixing bar 20' forming part of arrangement 16' is integrally formed as a single unit, as indicated above. In addition, as can be seen from FIG. 3, the mixing bar 20' includes lesser facets at its output face and the input beams are imaged onto its input face in an oval rather than circular fashion. However, in both cases, more output facets and therefore more output beams are shown than input beams. While this may be preferable, it is not necessary and the present invention is not limited to that relationship. Moreover, while overall arrangement 16 was described as forming part of the dye laser apparatus, it is to be understood that arrangement 16 and arrangement 16' could be used to convert other types of input light beams to substantially identical output beams for other purposes.

The foregoing description of the preferred embodiments of the invention have been presented for purposes of illustration and description. They are not intended to be exhausted or to limit the invention to the precise forms disclosed, and obviously many modifications and variations are possible in light of the above teaching. The embodiments were chosen and described in order to best explain the principals of the invention and its practical application to thereby enable others skilled in the art to best utilize the invention in various embodiments with various modifications as are suited to the particular use contemplated. It is intended that the scope of the invention be defined by the claims appended thereto.

What is claimed is:

1. An arrangement for converting a plurality of different input light beams into a plurality of substantially identical output light beams, said arrangement comprising:
    (a) an optical mixing bar including a main body for mixing light therein, an input face on one end of said main body, and a multi-faceted output face on an opposite end of said main body whereby light entering said main body from said input face is mixed therein and exits said output face as a plurality of mixed output light beams corresponding in number to the number of facets making up the output face, and
    (b) means for directing said plurality of different input light beams onto the input face of said mixing bar, whereby to cause said different beams to mix within the main body of said mixing bar and exit the latter from its multi-faceted output face as said plurality of mixed output beams.

2. An arrangement according to claim 1 wherein said directing means includes means for imaging said plurality of different light beams onto the input face of said mixing bar in an overlapping manner.

3. An arrangement according to claim 2 wherein said main body of said mixing bar is rectangular in cross-section and wherein said multi-faceted output face includes a greater number of facets than the number of said input beams.

4. An arrangement according to claim 3 wherein said multi-faceted output face includes six facets.

5. An arrangement according to claim 3 wherein said multi-faceted output face includes nine facets.

6. In a dye laser apparatus in which a particular copper vapor laser beam is directed into a dye cell forming part of the apparatus for producing or amplifying a dye laser beam, the improvement comprising an arrangement for providing said particular copper vapor laser beam and for directing it into said dye cell, said arrangement including:
 (a) means for producing a plurality of different copper vapor laser input beams;
 (b) an optical mixing bar including a main body for mixing light therein, a flat input face on one end of said main body, and a multi-faceted output face on the opposite end of said main body, whereby light entering said main body from said input face is mixed therein and exits said output face as a plurality of mixed output light beams corresponding in number to the number of facets making up the output face;
 (c) means for directing said copper vapor laser input beams onto the input face of said mixing bar, whereby to cause said input beams to mix within the main body of said mixing bar and exit the latter from its multi-faceted output face as a plurality of mixed copper vapor laser output beams which includes said particular copper vapor laser beam; and
 (d) means for directing said particular copper vapor laser beam into said dye cell of said dye laser apparatus from the output face of said mixing bar.

7. The improvement according to claim 6 wherein said means for directing said copper vapor laser input beams onto the input face of said mixing bar includes means for imaging said input beams onto said input face in an overlapping manner.

8. The improvement according to claim 7 wherein said means for directing said particular copper vapor laser beam into said dye cell includes an optical fiber having an input end and an output end, means for imaging said particular copper vapor laser beam onto the input end of said fiber whereby to cause that beam to travel through the fiber and out its output end, and means for optically coupling the output end of the fiber to said dye cell whereby the beam passing out the output end of the fiber through an optical assembly and into the dye cell.

9. The improvement according to claim 8 wherein said main body of said mixing bar is rectangular in cross-section and wherein said multi-faceted output face includes a greater number of facets than the number of said input beams.

10. The improvement according to claim 9 wherein said multi-faceted output face includes six facets.

11. The improvement according to claim 9 wherein said multi-faceted output face includes nine facets.

12. An optical mixing bar, comprising:
 (a) a main body optically configured for mixing light passing therethrough from one end thereof to an opposite end;
 (b) a flat input face located at said one end of said main body and serving as the entering face of the mixing bar for a plurality of light beams; and
 (c) a multi-faceted output face located at said opposite end of said main body whereby light entering said main body from said input face is mixed within said main body and exits the latter at said output face as a plurality of mixed identical output beams corresponding in number to the number of facets making up the output face.

13. An optical mixing bar according to claim 12 wherein said main body and input and output faces are integrally formed as a single member.

* * * * *